(12) United States Patent
Materna et al.

(10) Patent No.: US 9,056,535 B2
(45) Date of Patent: Jun. 16, 2015

(54) HITCH DETECTING SYSTEM

(71) Applicant: GM Global Technology Operations LLC, Detroit, MI (US)

(72) Inventors: William S. Materna, Shelby Township, MI (US); David A. Bodenmiller, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/954,312

(22) Filed: Jul. 30, 2013

(65) Prior Publication Data

US 2015/0035253 A1 Feb. 5, 2015

(51) Int. Cl.
*B60D 1/36* (2006.01)
(52) U.S. Cl.
CPC ........................................ *B60D 1/36* (2013.01)
(58) Field of Classification Search
CPC .............. B60D 1/00; B60D 1/58; B60D 1/62; B60D 1/248
USPC ....................... 180/14.1, 14.2; 340/425.5, 431
See application file for complete search history.

(56) References Cited

U.S. PATENT DOCUMENTS

| 3,130,805 | A | * | 4/1964 | Carter et al. ................. 180/14.1 |
| 3,924,257 | A | * | 12/1975 | Roberts ..................... 340/431 |
| 4,087,783 | A | * | 5/1978 | Steffen ......................... 340/431 |
| 5,149,121 | A | * | 9/1992 | Hafner ......................... 280/432 |
| 7,207,588 | B2 | * | 4/2007 | Bergum et al. ............ 280/446.1 |
| 7,309,075 | B2 | * | 12/2007 | Ramsey et al. ............... 280/477 |
| 8,100,426 | B2 | * | 1/2012 | Kronenberg ............... 280/411.1 |
| 8,738,196 | B2 | * | 5/2014 | Kronenberg .................... 701/1 |
| 2005/0000738 | A1 | * | 1/2005 | Gehring et al. ............. 180/14.1 |
| 2005/0212665 | A1 | * | 9/2005 | Flohr et al. ..................... 340/431 |
| 2006/0187008 | A1 | * | 8/2006 | Yu ................................. 340/431 |
| 2006/0290102 | A1 | * | 12/2006 | VanBuskirk, Jr. ............ 280/511 |
| 2007/0222181 | A1 | * | 9/2007 | Bergum et al. ............ 280/446.1 |
| 2007/0241869 | A1 | * | 10/2007 | Kalous .......................... 340/431 |
| 2009/0072956 | A1 | * | 3/2009 | Kalous .......................... 340/431 |
| 2010/0332049 | A1 | * | 12/2010 | Sy et al. ............................ 701/1 |
| 2010/0332266 | A1 | * | 12/2010 | Tamir et al. ...................... 705/4 |
| 2011/0209631 | A1 | * | 9/2011 | Viaud ............................... 100/8 |
| 2013/0038436 | A1 | * | 2/2013 | Brey et al. ..................... 340/431 |

* cited by examiner

*Primary Examiner* — Kevin Hurley
*Assistant Examiner* — Gabriella C Craciun
(74) *Attorney, Agent, or Firm* — Cantor Colburn LLP

(57) ABSTRACT

A hitch detecting system for a vehicle. The system includes a coupling assembly arranged to connect the vehicle to a hitchable apparatus. A sensor is operably coupled to the coupling assembly and monitors one or more parameters related to the coupling assembly. A controller is provided in communication with the sensor. The controller is operable to change, during operation of the vehicle, one or more functions of the vehicle in response to information detected by the sensor.

20 Claims, 2 Drawing Sheets

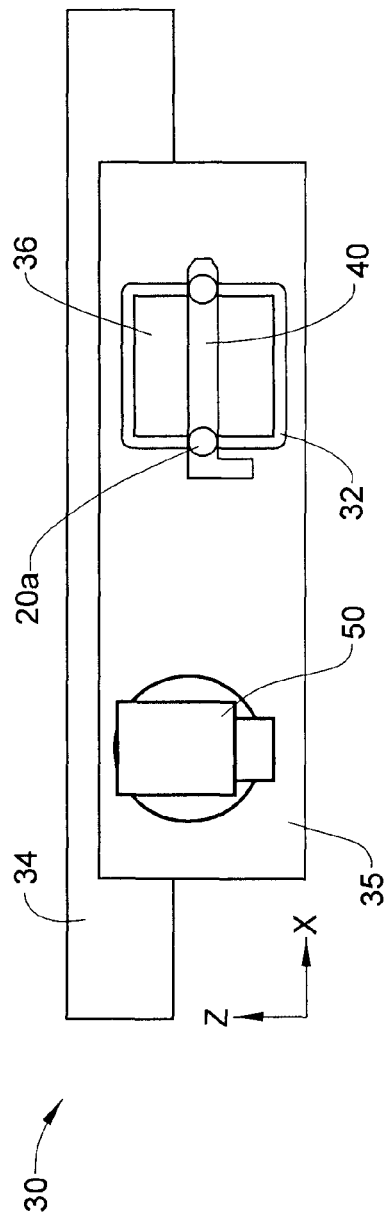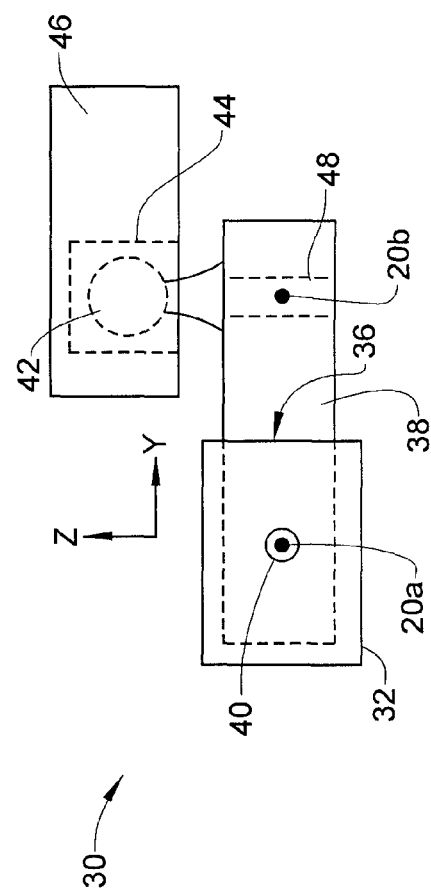

HITCH DETECTING SYSTEM

FIELD OF THE INVENTION

The subject invention relates to a hitch detecting system, and in particular, a hitch detecting system for an automobile.

BACKGROUND

Hitches for securing trailers and other hitchable apparatuses, such as bike racks and cargo carriers for example, are well known in the automotive industry. The presence of such apparatuses, potentially affects the performance or operation of an automobile. For example, characteristics such as braking and acceleration may be altered due to the size or weight of the apparatus. Current passenger vehicles have many automated systems (e.g., cruise control, autonomous braking, etc.), which are configured with respect to the default or expected operating characteristics of the passenger vehicle. These automated systems may not consider the added size or weight of a hitched trailer or other apparatus, which may lead to less efficient performance of the passenger vehicle.

Accordingly, it is desirable to provide a system for a passenger vehicle that detects and/or reacts to the presence of a trailer or other hitched apparatus.

SUMMARY OF THE INVENTION

In one exemplary embodiment of the invention a hitch detecting system for an automobile is provided. The system includes a coupling assembly arranged to connect the automobile to a hitchable apparatus. A sensor is operably coupled to the coupling assembly and monitors one or more parameters related to the coupling assembly. A controller is provided in communication with the sensor. The controller is operable to change, during operation of the vehicle, one or more functions of the vehicle in response to information detected by the sensor.

In another exemplary embodiment of the invention a method of operating an automobile is provided. The method includes detecting with a sensor one or more parameters related to a coupling assembly arranged to connect the automobile to a hitchable apparatus. Information pertaining to the one or more parameters is communicated from the sensor to a controller of the automobile. Operation of one or more functions of the automobile is controlled, during operation of the vehicle, with the controller in response to the information.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 illustrates an end view of a coupling assembly for the schematic system of FIG. 1; and FIG. 4 is a side view of the assembly of FIG. 3 attached to a coupling mechanism for a hitchable apparatus according to one embodiment disclosed herein.

DESCRIPTION OF THE EMBODIMENTS

Figure 1:
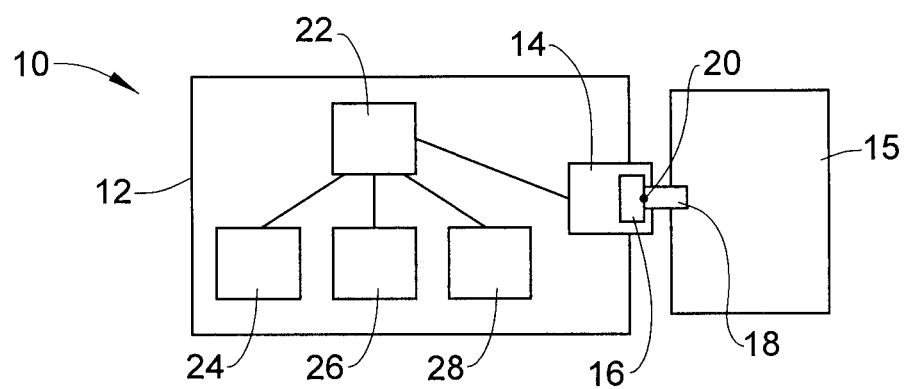
FIG. 1 schematically illustrates a hitch detecting system for a passenger vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, and with reference to FIG. 1, a hitch detecting system 10 is provided for a passenger vehicle 12. It is to be appreciated that while embodiments herein reference a passenger vehicle, the claimed invention should not be so limited and embodiments of the system 10 may be used with trucks, vans, sport utility vehicles, motorcycles, and any other vehicle. More specifically, the system 10 includes a coupling assembly 14 that enables a hitchable apparatus 15 to be hitched to, towed by, or carried by the passenger vehicle 12. The coupling assembly 14 may also be referred to as a trailer hitch, tow hitch, or tow bar assembly. For example, the hitchable apparatus 15 may be a trailer (including but not limited to those for general transportation of objects and items as well as those for specific purposes, such as hauling or carrying boats, motorcycles, agricultural equipment, campers, etc.), a bike rack, a cargo carrier, etc., or any other object, vehicle, vessel, or piece of equipment that is securable to the passenger vehicle 12 via the coupling coupling assembly 14. Namely, the assembly 14 includes one or more first coupling or connection components 16 that are complementarily formed with respect to one or more second coupling or connection components 18 of the hitchable apparatus 15 in order to establish a mechanical connection between the passenger vehicle 12 and the hitchable apparatus 15.

The hitch detecting system 10 also includes a sensor 20 that is operably coupled to the coupling assembly 14 to sense and/or monitor one or more parameters related to the coupling assembly 14 (thus related to the connection formed between the passenger vehicle 12 and the hitchable apparatus 15). In one embodiment, the sensor 20 detects the presence and/or absence of the coupling component 16, the second coupling component 18, or any intermediate components coupled therebetween. In this example, the sensor 20 may take the form of magnets and magnetic field detectors, RFID tags and receivers, light or laser sensors that are blocked by the detected components. In one embodiment, the sensor 20 detects and monitors the forces transferred between the passenger vehicle 12 and the hitchable apparatus 15, such as via the first coupling 16 and the second coupling components 18. In order to measure force, the sensor 20 may use piezoelectric materials, measure the displacement of a component and convert that displacement into a corresponding force using a preset conversion, or utilize any other suitable technology, such as strain gauges or load cells for example.

The information gathered by the sensor 20 is communicated to a controller 22 of the passenger vehicle 12 that controls one or more operations of the passenger vehicle 12. In this way, the controller 22 may control, configure, modify, or influence (collectively, "control") operation of the passenger vehicle 12 and/or various systems of the passenger vehicle 12, as discussed below. For example, if the presence or absence of first and second coupling components 16, 18 (or others), is detected, the controller 22 may be configured to determine that the hitchable apparatus 15 is (or is not) present, and adjust operation of the vehicle accordingly. Similarly, the controller 22 may be configured to perform steps in response to forces measured by the sensor 20, for example with greater forces indicating the presence of trailers or larger or heavier equipment.

The controller 22 may be, for example, a computer or computerized device, and may include any relevant hardware and/or software for controlling, monitoring, and/or communicating with various systems within the passenger vehicle 12. For example, the controller 22 may include memory, hard disks or other storage media, processors or logic units, wired or wireless transmitters and receivers. In the illustrated embodiment, the controller 22 is in communication with a power system 24 (including an engine), a transmission system 26 (including but not limited to gears, shifting mechanisms, clutches, etc.) and a braking system 28 (including brakes) in order to enable control of these systems with the controller 22. That is, for example, the added mass, weight, or size of trailers and other apparatuses may affect the operation of the passenger vehicle 12, e.g., acceleration, braking, etc. In this way, when it is determined by the controller 22 via the signal received from the sensor 20 that a trailer or other apparatus, is being towed by the passenger vehicle 12, the controller 22 may accordingly execute or cause the execution of control functions or operations of the passenger vehicle 12.

Examples of operations of the passenger vehicle 12 that may be controlled by the controller 22 include autonomous braking functions, such as by controlling the braking system 28, cruise control (by controlling the power system 24), automatic gear shifting, such as by controlling the transmission system 26 for example. Advantageously, this will enable the controller 22 to account for the weight and/or other characteristics of the hitchable apparatus 15 when controlling operation of the systems of the passenger vehicle 12. When the controller 22 determines that the hitchable apparatus 15 is no longer present or does not affect the performance of the passenger vehicle 12, the controller 22 may reestablish default operating characteristics for the passenger vehicle 12. Those of ordinary skill in the art will recognize that other systems and operations may possibly affect performance of the passenger vehicle 12 and may be controlled by the controller 22 in response to the information gathered or detected by the sensor 20.

Figure 2:
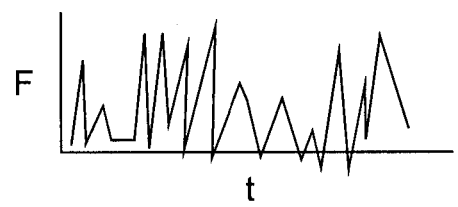
FIG. 2 schematically illustrates an example plot of force over time that may be measured by a sensor of the system of FIG. 1.

FIG. 2 schematically illustrates an example plot of the forces transferred between the passenger vehicle 12 and the hitchable apparatus 15 with respect to time, as measured by the sensor 20. The controller 22 may be arranged to evaluate this data, such as in real time for example, in order to control the operation of the passenger vehicle 12 as discussed above. Factors considered by the controller 22 include the duration of measured forces, the magnitude of measured forces, the direction of measured forces (for example forward/reverse, vertical or sideways directions), the frequency of measured forces, the occurrence and direction of forces during braking or acceleration. The controller 22 may be configured to perform a corresponding action, step or sequence of steps in response to the one or more parameters measured by the sensor 20 crossing one or more predetermined thresholds. For example, the controller 22 may be configured to interpret large forces (for example greater than a predetermined force threshold), forces applied over a relatively long duration (for example longer than a predetermined time threshold), forces directed away from the passenger vehicle 12 during acceleration and towards the passenger vehicle 12 during braking. Each of these parameters corresponds to or indicates the presence of a trailer or other apparatus. The controller 22 may also be arranged to react differently in response to forces falling within different threshold ranges. That is, for example, a first action (such as limiting autonomous braking functionality) may be taken by the controller 22 if force is within a first range, and a second action (such as completely disabling autonomous braking functionality) may be taken by the controller 22 if the force is within a second range. If something relatively light is detected that does not substantially affect the operation of the passenger vehicle 12 (such as a cargo carrier or bike rack for example), the controller 22 may not take any action to allow default operation of the systems 24, 26, 28 of the passenger vehicle 12 to occur.

One embodiment of the coupling assembly 14 is illustrated in FIGS. 3-4, and designated with the reference numeral 30. That is, the assembly 30 provides one example that may be used for connecting the passenger vehicle 12 (FIG. 1) to the apparatus 15 (FIG. 1). The assembly 30 in the illustrated embodiment is a receiver-type hitch assembly having a coupling component, illustrated in the form of a receiver 32, which is securable to a passenger vehicle frame or chassis member 34 via a support 35. In this way, the receiver 32 forms an embodiment for at least partially defining the one or more first coupling components 16 shown generally in FIG. 1. The support 35 may be removably connected, such as via bolts or other fasteners for example, to the frame member 34. It should be appreciated that other styles of hitch systems, such as fixed drawbar hitch systems for example, may also be used. The assembly 30 is provided for exemplary purposes only and the claimed invention should not be so limited.

Receiver-style hitch systems are configured to be removably connectable to a number of accessories and apparatuses, such as bike racks, cargo carriers, tow balls, for example, and the receiver 32 accordingly has an opening 36 arranged to receive a corresponding mount or platform 38. A pin 40 is included to removably secure the mount 38 to the receiver 32. In the illustrated embodiment of FIG. 4, the mount 38 is configured for a tow or hitch ball 42 that is engageable with a corresponding coupling component (the second coupling component 18) of the apparatus to be connected (the hitchable apparatus 15) to a vehicle (the passenger vehicle 12) via the assembly 30. In this way, the mount 38 or the tow ball 42 may also be understood to represent one embodiment of the schematically illustrated first coupling components 16 of FIG. 1. The tow ball 42 is engageable within a socket 44 of a tongue 46. The tongue 46 thus represents one example embodiment of the second coupling component 18 of the hitchable apparatus 15, also schematically illustrated in FIG. 1. It is to be appreciated that the first and second coupling components 16, 18 may take forms other than the illustrated examples of the receiver 32, the mount 38, the tow ball 42, and/or the tongue 46, such as hooks, lunette rings, clasps, and pintle assemblies, for example.

In FIGS. 3 and 4, a sensor 20a is depicted with the pin 40 and a sensor 20b is depicted with a shaft 48 extending from the tow ball 42. In one embodiment, the shaft 48 is a structural member that secures and/or enables the tow ball 42 to be releasably secured to the mount 38. The sensors 20a and 20b are provided as two embodiments of the sensor 20, and it is to be understood that all description of the sensor 20 applies generally to the sensors 20a and 20b. That is, as noted above with respect to the sensor 20, the sensors 20a and 20b may be arranged for monitoring one or more parameters related to the coupling assembly connecting between the passenger vehicle 12 and the apparatus 15 (the assemblies 14, 30). For example, the sensor 20a may detect the presence of the pin 40 or the mount 38 within the receiver 32 and transmit a signal to the controller 22. The sensor 20a may also measure forces transferred via the pin 40 between a vehicle 12 and a hitchable apparatus 15 and transmit a signal to the controller 22. The sensor 20b may be similarly configured to allow the controller 22 to detect the presence of the shaft 48 within the mount 40, or to monitor forces transferred via the tow ball 42 and the shaft 48 to the mount 38 or the receiver 32.

It is to be appreciated that multiple sensors 20 may be included, and that the sensor or sensors 20 may be included in any component of a coupling between a vehicle and a hitchable apparatus. In one embodiment, the sensor 20 is included in a bushing surrounding or supporting the pin 40 or the shaft 48. In one embodiment, the sensor 20 is included in bolts or other fasteners releasably securing the support body 35 to the frame member 34, the receiver 32 to the support body 35, or the tow ball 42 to the mount 38. In one embodiment, the sensor 20 is included with an electrical panel 50 of the assembly 30, and information regarding the apparatus 15 is electrically communicated to the passenger vehicle 12. It should be appreciated that the sensor 20 may be located in any coupling component, connector, fastener, or attachment device, that is suitably positioned to detect one or more parameters related to the coupling between the vehicle and the trailer or other apparatus, such as the presence/absence of one or more coupling components, forces exerted between the trailer and the apparatus (measured directly or indirectly via connection to other components for example). In this way, the controller 22 may control performance of the vehicle 12, in response to the detected parameters in order to enable the vehicle to more efficiency or effectively tow, hitch, or carry a desired apparatus.

It should be appreciated that while embodiments herein describe the controller 22 as a discrete component, this is for exemplary purposes and the claimed invention should not be so limited. In other embodiments, the functionality of the controller 22 may be distributed among several processors or controllers. For example, the functionality of the controller 22 may be distributed and performed by the systems 24, 26, 28. In another embodiment, the functionality of controller 22 may be integrated in to the engine control module (ECM). In still other embodiments, the controller 22 is integrated into the sensor 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A hitch detecting system for a vehicle, comprising:
a coupling assembly arranged to connect the vehicle to a hitchable apparatus, the coupling assembly having a receiver and a mounting member, the mounting member coupled to the receiver by a transversely mounted pin, the pin being arranged substantially parallel to a support mounted to a vehicle frame member, the coupling assembly further having a tow ball coupled to the mounting member by a shaft;
a first sensor operably coupled to the pin, the first sensor configured to monitor one or more first parameters related to the coupling assembly;
a second sensor coupled to the shaft, the second sensor configured to monitor one or more second parameters related to the coupling assembly; and
a controller in communication with the first sensor and second sensor, the controller operable to change, during operation of the vehicle, one or more functions of the vehicle in response to information detected by the first sensor and second sensor.

2. The hitch detecting system of claim 1, wherein the hitchable apparatus includes a trailer.

3. The hitch detecting system of claim 1, wherein the one or more first parameters correspond to a presence of one or more coupling components of the coupling assembly, wherein the one or more first parameters includes the detection of the presence of the pin.

4. The hitch detecting system of claim 1, wherein the one or more first parameters correspond to an absence of one or more coupling components of the coupling assembly, wherein the one or more first parameters includes the absence of the pin.

5. The hitch detecting system of claim 4, wherein the coupling assembly is a receiver-type hitch and the receiver includes an opening receptive to receive the mount, and the pin is arranged to removably secure the mount to the receiver.

6. The hitch detecting system of claim 5, wherein, the pin is supported by a bushing, the sensor being disposed with the the bushing.

7. The hitch detecting system of claim 5, wherein the the one or more second parameters corresponds to the presence of the shaft in the mount member.

8. The hitch detecting system of claim 5, wherein the one or more second parameters correspond to a measurement of one or more forces transferred between the shaft and the mount member.

9. The hitch detecting system of claim 1, wherein the one or more functions includes a cruise control function, an autonomous braking function, an automatic gear shifting function, or a combination including at least one of the foregoing.

10. The hitch detecting system of claim 1, wherein the one or more functions correspond to operation of a power system of the vehicle, a transmission system of the vehicle, a braking system of the vehicle, or a combination including at least one of the foregoing.

11. The hitch detecting system of claim 1, wherein the controller performs an action in response to the one or more second parameters crossing a predetermined threshold.

12. The hitch detecting system of claim 1, wherein the controller performs a first action in response to the one or more second parameters being within a first predetermined range and a second action in response to the one or more second parameters being within a second predetermined range.

13. A method of operating a vehicle, comprising:
detecting with a first sensor one or more first parameters corresponding to a coupling assembly arranged to connect the vehicle to a hitchable apparatus, the sensor being operably coupled to a pin that secures a mount member to a receiver, the coupling assembly further having a tow ball coupled to the mount member by a shaft;
detecting with a second sensor one or more second parameters corresponding to the coupling assembly, the second sensor being operably coupled to the shaft;
transmitting a first signal indicating the one or more first parameters from the first sensor to a controller of the vehicle;
transmitting a second signal indicating the one or more second parameters from the second sensor to the controller; and controlling, during operation of the vehicle, one or more functions of the vehicle with the controller in response to the first signal and second signal.

14. The method of claim 13, wherein the one or more functions include an autonomous braking function, a cruise control function, an automatic gear shifting function, or a combination including at least one of the foregoing.

15. The method of claim 14, wherein the one or more second parameters includes forces and the detecting includes detecting forces transferred between the shaft and mounting member.

16. The method of claim 14, wherein the one or more first parameters includes a presence or an absence of the pin.

17. The method of claim 14, wherein the controlling includes the controller performing an action in response to the one or more first parameters or second parameters crossing a predetermined threshold.

18. The method of claim 14, wherein the controlling includes the controller performing a first action in response to the one or more second parameters being within a first range and a second action in response to the one or more second parameters being within a second range.

19. The hitch detecting system of claim 9 wherein the controller is further operable to change, during the operation of the vehicle, the one or more functions of the vehicle to a default operating characteristics in response to information detected by the first sensor and second sensor.

20. The method of claim 18 wherein the performing of the second action includes changing the one or more functions of the vehicle to a default operating characteristics.

* * * * *